United States Patent [19]
Müller et al.

[11] Patent Number: 5,301,564
[45] Date of Patent: Apr. 12, 1994

[54] GEAR CHANGE BOX WITH MULTIPLE STEPS

[75] Inventors: Franz Müller; Jürgen Pohlenz, both of Friedrichshafen; Hubert Lehle, Meckenbeuren; Erwin Baur; Herbert Simon, both of Friedrichshafen, all of Fed. Rep. of Germany

[73] Assignee: Zahnradfabrik Friedrichshafen AG, Fed. Rep. of Germany

[21] Appl. No.: 781,217

[22] PCT Filed: Jul. 2, 1990

[86] PCT No.: PCT/EP90/01056
§ 371 Date: Jan. 3, 1992
§ 102(e) Date: Jan. 3, 1992

[87] PCT Pub. No.: WO91/00445
PCT Pub. Date: Jan. 10, 1991

[30] Foreign Application Priority Data
Jul. 5, 1989 [DE] Fed. Rep. of Germany ....... 3922053

[51] Int. Cl.⁵ .............................................. F16H 3/08
[52] U.S. Cl. ...................................... 74/333; 74/359; 74/360; 74/15.4
[58] Field of Search ................. 74/745, 333, 360, 359, 74/15.4, 15.66, 15.6

[56] References Cited

U.S. PATENT DOCUMENTS

| | | | |
|---|---|---|---|
| 2,975,656 | 3/1961 | Haverlender | 74/745 OR |
| 3,897,699 | 8/1975 | Hoyer | 74/745 OR |
| 4,116,090 | 9/1978 | Zenker | 74/745 OR |
| 4,294,130 | 10/1981 | Kisaka et al. | 74/15.4 OR |
| 4,640,146 | 2/1987 | Buback | 74/745 X |
| 4,685,343 | 8/1987 | Ehrlinger et al. | 74/359 X |
| 4,777,837 | 10/1988 | Lehle | 74/333 X |
| 4,785,682 | 11/1988 | Nishimura et al. | 74/333 X |
| 5,014,566 | 5/1991 | Kashiwase | 74/331 OR |

FOREIGN PATENT DOCUMENTS

| | | |
|---|---|---|
| 548398 | 3/1984 | Australia . |
| 0262625 | 4/1988 | European Pat. Off. . |
| 2219242 | 10/1973 | Fed. Rep. of Germany . |
| 2645957 | 4/1978 | Fed. Rep. of Germany . |
| 2063395 | 6/1981 | United Kingdom . |

Primary Examiner—Leslie A. Braun
Assistant Examiner—Daniel Wittels
Attorney, Agent, or Firm—Davis, Bujold & Streck

[57] ABSTRACT

The gear-change transmission has a closely stepped input group (7) before a main group for fine tuning the speed within a working range. Between the input group (7) and the main group (8) is situated a pressurized-oil cooled drag-torque reducing multi-disc starting clutch (26) so that the gears in both groups can also be easily engaged when using synchronizer positive clutches (18, 20). A reversing shaft (13) for reverse gear is fully integrated in the input group (7) and its gear clutches (F/G) can be introduced with a gear selector (83, 112) the same as for the remaining splitter gears of the input group (7). A change-over clutch (36) for an intermediate transmission (9) is optionally placed directly before the starting clutch (26) operatively and structurally on the primary shaft (32) of the starting clutch (26). The main drive shaft (10) is guided parallel to the countershaft (12) and to the drive shaft (39) of the main group (8) through the common transmission housing (1) and is connectable, via a separating clutch (67) and via a two-step transmission group (68, 69, 70, 71, 72), with a power take off shaft (73). The input group (7), with the same arrangement of the shafts (11, 12, 13), can be equipped either with hydraulic double gear clutches (A, B, C, D, F, G) axially aligned in respect to each other or with double synchronizer clutches. In the first case, there is provided over the main group (8) on the main drive shaft (10), a change-over clutch (25) for a mechanical bypass operative connection of the powershift clutches (14, 15, 16) utilizable in forward or reverse direction for towing or emergency possibilities.

34 Claims, 7 Drawing Sheets

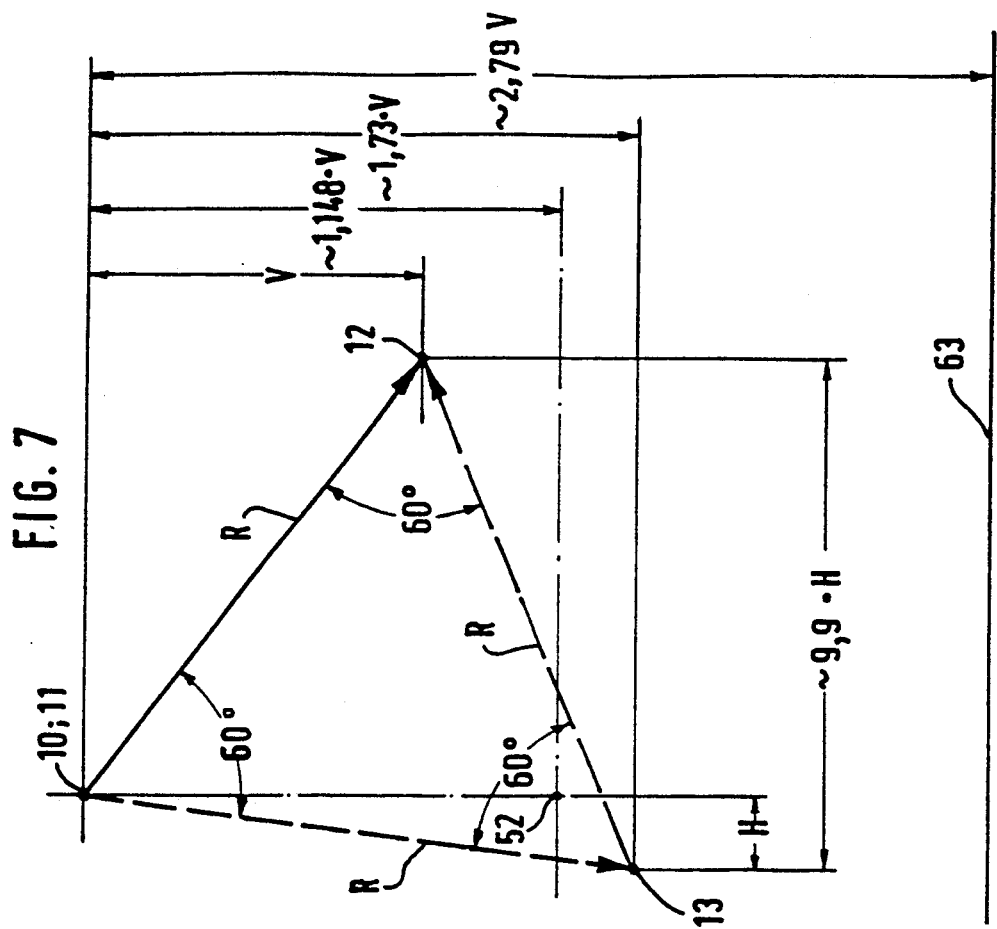
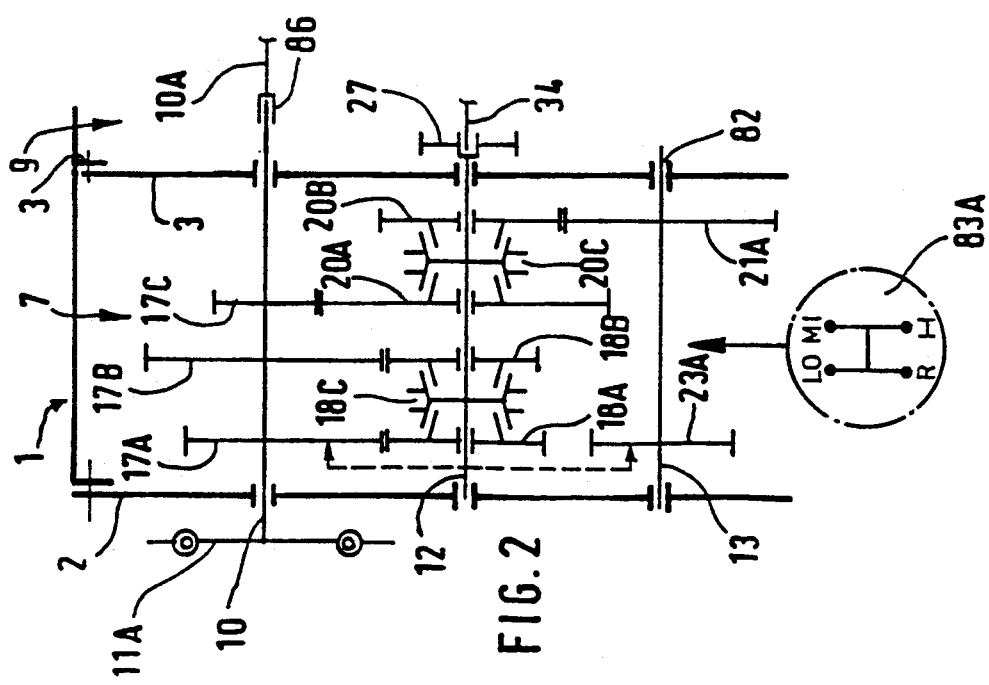

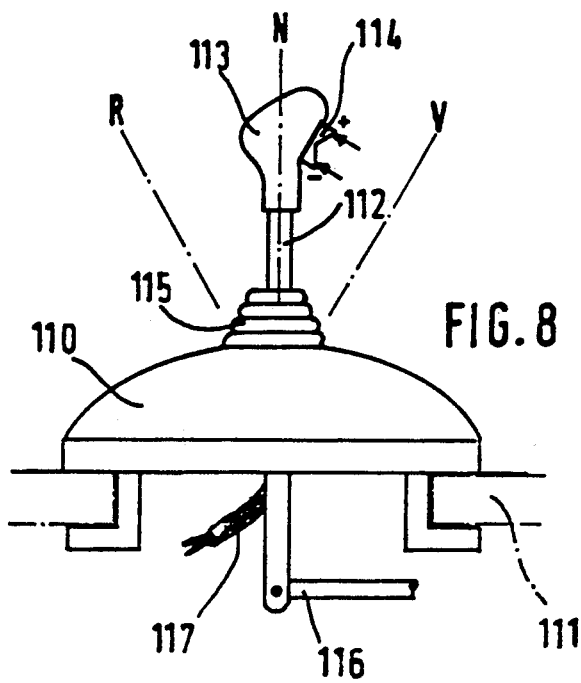
FIG. 8
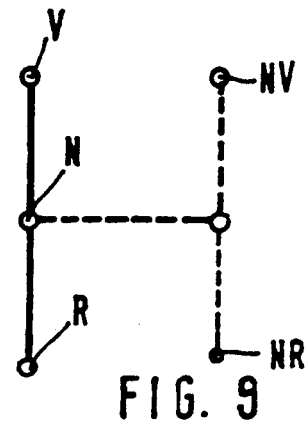
FIG. 9
| | | A | B | C | D | F | G |
|---|---|---|---|---|---|---|---|
| V | L | ● | | ● | | | |
| | M | ● | | | ● | | |
| | H | | ● | ● | | | |
| | S | | ● | | ● | | |
| R | L | | | ● | | ● | |
| | M | | | | ● | ● | |
| | H | | | ● | | | ● |
| | S | | | | ● | | ● |
FIG. 10

GEAR CHANGE BOX WITH MULTIPLE STEPS

FIELD OF THE INVENTION

The invention concerns a gear-change transmission with multiple steps 1. Transmissions of this kind are as a rule used for tractors and certain construction vehicles which must allow jerkless movements at low speeds under light or heavy loads, frequent changes of direction, and relatively quick on-road travel for transportation purposes, etc. A summary about the most needed working speeds of tractors in agriculture is found in K.T. Renius, Traktoren, Verlagsunion Agrar, 1985, page 93.

In order to make it possible to satisfy such different service conditions in a manner reliable to operate, economic in energy and easy to service, change-over gears are needed which have a wide range of ratios and many ratio steps which allow an optimal utilization of the available tractive forces of the engine at all traveling speeds (for instance 0.3 to 60 km/h). The transmission must allow the vehicle (tractors or ground-leveling machines, etc.) to perform in all conceivable forms of soil and provide the corresponding tractive forces needed (for instance, to plow or pull power take off implements, for driving along power take offs, or for hydraulic pumps) while avoiding engine down time and wheel skidding. Transmission layouts having gear steps of about 1.2 to 1.3 are today regarded as sufficient for these purposes. Thus, depending on given speed limits such as from 40 to 50, separate gear steps can be required.

When both forward travel and reverse travel are required with respectively equal ratios, all of the forward gears present must be reversible at will, that is, the gear set for the reverse gear must also be driven during the forward gear to avoid the expense of a special front- or rear-mounted reversing gear. For simpler use and production of transmissions having so many speed levels, the whole transmission is, as a rule, divided into separate groups such as input or splitter group for fine tuning, main group such as a range group, and depending on necessity, creeping gear, overdrive and/or power take off groups, etc. It is then possible for quick transportation of light loads to limit the switch operation to actuating a wide-stepped main group as in a passenger car. Said wide-stepped main group having at most four or six gears and designed as a range-change group, wherein the switching steps for slow travel and heavy inserts can remain permanently adjusted in a coordinated splitter group. On the other hand, one of the main-group gears can be permanently pre-selected for work and the switch operation, with fine tuning to the operatively required greater tractive forces, can remain limited, with lesser speed steps, to the splitter gears SLOW, MEDIUM, HIGH, OVERDRIVE. In this manner it is possible in the most important working ranges to select each gear with only one gear lever per group with a relatively simple gearshift pattern. However, as the number of gear steps increases, as Renius observes (see above) on page 90, lines 9/10 from bottom, considerable problems occur. In the prior art, the gearshift levers and the starting clutches must be simultaneously actuated if additional separate steps such as creeping gear, overdrive or reverse gear are to be engaged, since their gear sets and shift elements are situated outside the splitter group or main group in an intermediate or additional group.

A transmission of said kind has been disclosed in DE-C 26 45 907 for substantially the same purposes as the invention. It essentially consists of a splitter group in the form of a closely-stepped input group all of whose fixed gears are lined up next to each other on an input shaft directly driven by the main drive and whose gear clutches and idler gears are all lined up on a first counter shaft. The splitter group has one main group operatively situated behind the input group with a drive shaft situated axially and in extension of the first countershaft and an output shaft operable therewith via gear clutches, idle gears and fixed gears meshing therein. Spatially situated between the input group and the main group is an intermediate transmission which contains both a gear set for creeping gear and a gear set for reverse gear whose shift elements are situated successively on the first transmission shaft which carries the gear clutches of the input group. Both the secondary shaft of the gear clutch for reverse gear and the drive shaft of the main group come to lie coaxially and in extension of the first transmission shaft.

The shift elements in the input group (according to column 2, lines 47/48 of the cited patent) can optionally be positively or non-positively locking clutches. In order to make shifting easier and within a shorter time, the selected shift elements must be dimensioned in such a manner that frequent braking during operation of all simultaneously rotating weights must be possible without wear and with currently changing accelerations, torques, directions of rotation in heavy vehicles, and correspondingly rough operating conditions. This must be accomplished with a sufficiently long operating life.

In the prior art, it is disadvantageous that the total of forces due to gravity from the transmission steps, operatively situated behind the starting clutch before the input group, have to be synchronized directly with the input group in all shifting operations. It is also unfavorable in the prior art that the staring clutch works at a different speed from the gear clutches in the input group.

These circumstances impair the possibilities of providing a vehicle with a wide speed range with simultaneously good traveling properties (equal ratio steps, higher power per unit of surface, less consumption). The prior art does not ensure optimal efficiency over the entire speed range. In the prior art it is also not possible to drive the forward gears at the same speed as the reverse gears. In addition, the necessity of actuating the starting clutch when shifting makes the operation of the prior art transmission difficult in rough terrain.

In order to take into account the wear on the friction surfaces of the starting clutch associated with the considerable forces due to gravity, it was hitherto necessary in transmissions of that kind (for instance, according to DE-C 22 19 242) to take the trouble of disposing dry starting clutches in a manner such that their friction surfaces could be replaced relatively easily without having to open the transmission proper. It was further endeavored to provide friction surfaces as large as possible for efficient cooling—as a rule with air—and to provide small specific loads which avoided heavy wear. In addition, the preferred air-cooled starting clutches acting as dry friction bases could be exposed outside of the transmission housing to a permanent fan-air current. However, these steps resulted in the need for considerable installation space for the large dry clutches and also led to further consumption of auxiliary energy for the permanently pressurized air cooling which impaired the total efficiency of the machines. To improve performance great weights were added for braking or accelerating resulting in such long shift periods and such great shifting forces that both comfortable operation and safety in traveling were more and more unsatisfactorily reduced as the vehicle performances increased. It is true that it was sought to obviate these circumstances by using powershift clutches instead of synchronizing clutches. But when the powershift clutches were lined up next to each other exactly like the synchronizing clutches, the increase in lengths associated therewith proved to be too expensive and obstructive for many vehicle constructions.

In the DE-C 26 45 907 to which reference is made as a generic construction, it is also disadvantageous that the power take off shaft has to be installed under difficult spatial conditions at the exit of the so-called close-stepped transmission, and, thus, laterally adjacent to the rear-situated groups or gear-change transmissions. The simultaneous use of the main drive or input shaft leading to the power take off shaft for other power take offs cannot be discussed here for reasons of space.

The problem to be solved by the invention, departing from the above, is seen in providing a gear-change transmission with multiple steps and a power take off shaft arrangement which together allow multiple utilizations and can be built as short as possible and is easily operable with powershift clutches. The invention also being utilizable with high efficiency for particularly tractors having wide speed ranges in which the shifting operations in the input group remain undisturbed by weights situated at the rear in the main group. Also, if necessary, it can be used in a separately engageable intermediate transmission where the starting and separating clutches are better suited for the loads resulting from rough work and requiring small spaces without using therefor longer shifting periods or extra auxiliary energies.

SUMMARY OF THE INVENTION

According to the invention the solution of said problem consists in the first place of providing, by extending the main-drive shaft along the main group up to the rear side of the housing, a power take off arrangement adequate for several power take offs without length increases and a shaft and clutch system in the input group in which the starting clutch is coaxial with the first countershaft. In essence, the starting clutch and first countershaft can rotate at the same speeds. Also, for reducing the weight, the starting clutch lies spatially and operatively between the input group and the main group as a wet multi-disc clutch cooled by pressurized oil essentially when coupling. The starting clutch can be designed as a connecting element between the input group or transmission and the main group and as a starting clutch in a manner so as to be easily cooled, frictionless, and easily operable.

Since the power take off shaft issuing from the input shaft is paraxially extended along the main group up into the area of the transmission rear side, there exists favorable possibilities for accommodating other power put offs which can be easily added without having to change the input shaft proper or otherwise interfere in the transmission or axially enlarge the transmission housing.

With the input group operatively and structurally according to the invention and a specially frictionless starting clutch situated behind the intermediate transmission and before the raised main-group driving shaft, the gear clutches of the input group can be effectively released from the forces of inertia originating from the main group and equipped with quickly rotating gear steps without the clutch causing immersion losses. The forces of inertia from the input group or the intermediate transmission need only be synchronized with the prime mover, which due to their lower speeds compared to the main group is less difficult than when additional forces of inertia from quickly rotating shafts had to be synchronized with the gears, as in the case of starting clutches situated in front of the input group. The elimination of a large dry friction clutch and the passage of a wet multi-disc clutch, pressure-cooled with circulating oil at least during engagement, produces a reduction of the drag torque when disengaging, easier synchronized operation, and a quite considerable prolongation of operating life with minimal need of axial construction space in the transmission housing itself. Since the clutch is not endangered by overheating, clogging, or (as in externally situated dry clutches) mechanical damage from the outside such as resulting from gravel, etc., the operational safety of the transmission is further increased. In addition, the starting clutch does not have any permanent immersion losses, since it can rotate outside of the oil level. Since the oil cooling of the friction surface of the starting clutch can be shut off by a clutch-dependent oil valve which closes upon disengagement, possible disc drag torques are minimized for easy and quick change of gears.

Other advantageous embodiments of the invention;

If the input group si equipped with synchronizer gear clutches arranged next to each other upon the first countershaft and coaxially with the primary shaft of the starting clutch, absolutely no speed differences between the gear and the starting clutch are to be expected during engagement.

When using powershift clutches in the input group, it is favorable for a short axial construction to situate them on the three shafts in radial alignment in respect to each other and not to insert them in rows.

Since reverse gear is obtained by a reversing shaft constantly rotating in the input group and parallel with the first countershaft (and by integrated reverse-gear clutches), the reverse gear needs no axial construction space of its own and it can be introduced by the same gear-selection device as the remaining splitter gears. In addition, shift backstrokes are attenuated and intermediate transmissions are often avoidable when utilizing the lowest working speeds or highest road speeds, since the reverse gear is now in the input group. The use of a single lever in field work and also in transportation thereby becomes possible. Besides, the reverse-gear clutch can be designed as a double clutch due to the integration of the input group without adding to the length of the transmission and without great extra expense, and thus, the number of possible reverse gears can be increased.

When using multi-disc gear clutches each having a clutch bell on each of the shafts of the input group, it is possible to change the splitter gears without actuating the starting clutch, and the length of the input group is not greater than when equipped with two adjacent double synchronizer clutches.

When placing the synchronizer gear clutches only on the first countershaft, any speed difference relative to the primary shaft coaxial therewith of the starting clutch is eliminated so that no synchronization is additionally needed.

If synchronizer gear clutches and a reverse gear, introducible thereby, are provided in the input group, no other gear-selection device (lever or switch) is needed for introducing or reversing the gear than those used in the input group, as it still is necessary in the known type of transmission. Therefore, a specially quick and comfortable change of direction is ensured.

With the possibility of providing, for the transmission according to the invention, a purely mechanically operated emergency drive connection with auxiliary power-actuatable clutches independent of electric installations, there can be created, just by means of a simple dog clutch on the input shaft, a manually introducible positive engagement of the primary shaft of the starting clutch in respect to the drive shaft of the main group. This makes it possible to tow start or emergency operate the vehicle with its own power via the main-group gears, even forward or backward, when, for instance, auxiliary power-actuated gear clutches in the input group can no longer disengage due to a defect in power or hydraulic supply. This device also permits, when needed, supporting the vehicle against the stationary engine or to tow start the engine. The six main-group gears can also be easily engaged, and, in case of failure of a gear clutch of the input groups, field work or transportation can be finished before any repairs are needed.

When using a vibration damper on the drive side before the input group from which an undamped solid shaft is extended through an input shaft which is hollow, rotation and vibrations originating from the transmission are minimized at a power take off which is to be eventually attached resulting in a favorable arrangement of the bearings and drive gears, etc. on the larger diameter of the hollow shaft. Since there is a free space sufficient for installing a gear clutch between the first housing partition and the starting clutch and the connection of the first countershaft and the primary shaft of the starting clutch is produced by a replaceable shaft sleeve, there is the possibility of providing an intermediate transmission without changing the construction or length of the basic transmission or the clutch and designing identically all the parts needed therefor.

Even an intermediate axle in the free space with an axial bearing in the area of connection and the possibility of accommodating the double gear required in the installation of the intermediate transmission can be provided both for axial support of the first and second housing partitions and for passing oil ducts from the main group to the input group and vice versa.

If an intermediate transmission is installed in said free space and if a dog clutch or synchronizer clutch with sleeve carrier combined with a fixed gear and an idler gear on the primary shaft of the starting clutch is substituted for the shaft sleeve, it is possible, according to the invention and depending upon the need, to situate before the starting clutch either an intermediate stepped up or stepped down gearing or a direct through drive to the main group. The weights of the main group behind the starting clutch remain nevertheless with the vehicle without affecting the starting clutch during the change of gear. Only the selected size of the gears to be interengaged in the gear clutch and on the intermediate axle determines whether a creeping gear or overdrive is obtained.

When equipping the main group, the fact that the starting clutch rotates directly with its drive shaft, at least when situating the overdrive gears on the same shaft, benefits the quality of the gear shift in the overdrive range.

By supporting the ends confronting each other on the intermediate transmission side of the shafts of the input group and of the main group by means of bearings inserted in separate housing partitions, the whole transmission is favorably rigid and noiseless. In addition, an uncomplicated assembly results for easy disassembly or inspection of the input group which is more stressed by the great frequency of shifting and high torques. An eventual revision of the starting clutch is also simplified, since the housing half of the main group likewise does not have to be opened for this purpose.

In the serial production of such transmissions it can also be advantageous to delay the final equipment of the transmission housing with the input groups and the insertion of the first partition after assembly of the main groups, for example, until having definitive customers' decisions as to whether powershift or synchronizer clutches, etc. are desired.

By arranging the central axles of the input shaft, countershaft and reversing shaft to form an equilateral triangle, it can be ensured that exactly the same revolutions or speeds of the different gears are obtained in forward and reverse travel, and still more elements of the same structure can be used.

An especially material and space-saving design of the input group is obtained by the fact that instead of separate gears, the external disc carriers of the power-shift clutches are provided with crown gears placed on their external diameter which act as a substitute for separate gears. By means of more or less long teeth, the gear-clutch bell of the reversing shafts can be carefully engaged with the input shaft but not with the first countershaft which is directly driven by the input shaft.

By an arrangement of the fixed and idler gears conceived on the basis of weight compensation and of the coordinated disc carriers of the clutch, it is obtained, even when using the powershiftable multi-disc clutch, a satisfactorily rotating and compact or short design of the input group wherein several gears are given double functions. Thereby, the starting clutch can remain unused during operation of the input group as long as no change of direction occurs.

By moving the main operative connection from the input shaft to the first countershaft on the drive side of the gear clutch thereof and situating the reverse-gear wheel on the output side thereof, the axial space of the change-over clutch for the emergency travel device is substantially axially covered by the reverse-gear wheel so that only a small axial length itself is used for both devices.

When realizing certain vertical and horizontal center-to-center distance ratios of the transmission shafts in respect to each other, specially advantageous housing possibilities result in the vehicle such as better access for service, etc. while ensuring the ratio steps sought.

The optional attachment of a front-axle drive to the output shaft of the main group also offers, with a certain center-to-center distance ratio in respect to the distance of the drive shaft of the main group to the output shaft, an especially favorable adaptation to the dimensions of the vehicle.

By designing the intermediate transmission as a creeping gear, it is possible with a certain ratio selection to obtain both a speed of only about 0.3 to 0.4 km/h and additional space radially below the intermediate transmission for a shaft brake in the front-axle drive.

When designing the intermediate transmission as simple overdrive with a certain speed ratio, correspondingly high speeds can be obtained without having to give up optimal low speeds for working purposes.

If a synchronizer gear clutch is used for engaging and disengaging the intermediate transmission, it is possible with only one shift step to quickly and comfortably carry out extreme speed changes such as when passing from off road to road and vice versa.

With a dished lower bulge of the first housing partition which has a wall area raised upon the drive side above the intermediate axle, the partition is advantageously further reinforced creating a favorable possibility of support for the intermediate axle, and the fixed gear of the intermediate transmission, which as a rule rotates empty, is prevented from triggering unfavorable drag torques in the oil contents of the transmission housing.

The arrangement of the starting clutch on a front end of the main-group drive shaft which projects up to the first housing partition favors the exact centering of the countershaft and the drive shaft and allows for designing the primary shaft at the same time for accommodating a plug-in connection suitable as axial bearing so that thrusts from both transmission groups can be at least partly eliminated in the center of the housing.

In the main group, the gear clutches of the overdrive gears are provided on the drive shaft that carries the starting clutch, this substantially facilitates the shiftability of the main group independently of whether the clutches are designed with or without synchronization.

When for reasons of space the gear clutch for the slow gears is situated on the drive shaft, there is hardly any disadvantage since said gear clutch practically never has to be engaged when road traveling.

By designing the starting clutch with an internal disc carrier which forms an axially open annular pocket on the main-group side and has radial bores, it is possible (for example, by a valve of a type known per se combined with the clutch) to carry out an oil-injection cooling limited to the engagement periods of the clutch. The oil supply is controlled by means of an oil valve attached to the pump pressure line or by locking elements integrated in the clutch. Both designs allow the activation of the coolant supply only when engaging the clutch pedal. Energy savings are thus obtained by reducing the immersion torques and the pump power without impairing the dead times of the starting clutch in the lowest drag torques during disengagement of the clutch.

By means of hydraulically actuated bolts that axially penetrate the radial web of the internal disc carrier and a cup-locking spring on the rear side of the clutch plates, it is possible to introduce power from the shaft hub into the disc set without the need of a cylinder drive with a piston in the rotating clutch bell. Since the neck of the pressure piston issuing from the cylinder beneath the shaft which bears into the housing partition abuts on the front side on an axial bearing the stresses on the shaft bearings remain small. By virtue of the hydrostatic actuation of the starting clutch, independently of a pump circuit, both a power reinforcement and a possibility of partial automation is provided. There can also be provided, for instance, a forward-reverse switch upon the activation of which the starting clutch is automatically also actuated.

The hydraulic shift pressure remains available even if electric-electronic installations should fail.

An especially simple design of the clutch-adjusting member results with a stepped annular piston which is surrounded by both piston seals and stressed by means of a spiral spring which keeps it in place against the axial bearing so that the clutch plate can be quickly opened by oil pressure against the cup spring tension and the axial play can be compensated.

The arrangement of the fixed gear serving as drive gear for a front-axle drive on an end of the drive shaft of the main group, which end projects on the drive side from the second housing partition, makes it possible with a safety nut to branch off of the front-axle drive of the transmission on a place where its bearings and clutch can be spatially favorably accommodated before the second housing partition by virtue of the axial covering with the starting clutch without lengthening the housing. In addition, here can be also attached both a change-over clutch and a shaft brake. An eventual change of the clutch or brake is also possible without therefor disassembling the main group.

A shaft brake after the change-over clutch for the front-axle drive can be optionally provided in an arrangement favorable for assembly and operation by supporting the outer shell in a removable first housing partition or in the front cover of the transmission.

A change-over clutch for the mechanical bypass operating connection for bypassing the powershift clutches of the input group takes up little space, is easy to assemble, and is of reasonable price when its sleeve carrier, non-turnable on the input shaft, is situated axially between the output-side idler gear of the input gear clutch and the bearing of the input shaft in the first housing partition.

With a power take off shaft freely extending over the main group and above the oil level, there is facilitated a subsequent installation or reconstruction of accessory power take offs without interfering in the whole remaining transmission. With a fixed gear on any place of the free part of the power take off shaft, it is possible, for instance, to uniformly drive a pump shaft constantly at engine speed independently of what transmission steps are at the time activated in the groups.

Since there is free space over the main group, the installation of a multi-gear connecting device of the power take off shafts axially over the main group is possible without any axial lengthening worth mentioning.

Finally, there is still space on the power take off shaft for the subsequent mounting of a direction-dependent drive of the power take off shaft with a drive from one of the gears to the drive shaft of the main group.

By limiting the oil level to a level lower than the axial center of the main-group drive shaft and by the lubrication ducts supplied by the central pump, all lubrication places are reliably placed within the walls and the shafts without immersion torques unnecessarily increasing due to constantly inundated transmission parts.

By a ring collar with adequately limited annular ducts in the housing of the shaft bearing, the control pressures for the powershift clutches are favorably introduced in the shaft bores without small leakages. The coolant and pressurized oil supplies to the starting clutch are in the same sense advantageously obtained through the adjacent housing partition.

For servicing the assembly, it is favorable that the dimensions of the first housing partition pass through a housing opening on the drive side and that said partition be reliably detachable/securable on an inner housing flange axially before the second wall.

The invention is not limited to the combination of features of the claims. Other possible logical combinations of claims and individual features of the claims result for the expert according to the existing problem. The invention is described in detail herebelow with reference to an embodiment and to the following drawings:

BRIEF DESCRIPTION OF THE DRAWINGS

FIG. 2 diagrammatically shows an extract of the same transmission concept with a type of design of the input group preferred for smaller performances having adjacent synchronizer clutches only on the countershaft;

FIG. 7 shows a corresponding diagrammatic illustration of the distance ratios and coordinations of the transmission shafts with each other in a front view opposite to the direction of travel;

FIG. 8 shows a diagrammatic side view of a one-hand lever reversing switch of the input group when equipped with powershift clutches;

FIG. 9 shows the gearshift pattern of the lever without the diverse shift points of the integrated tumbler switch actuatable independently of the end positions of the lever;

FIG. 10 shows in table form the sequence of gear selection obtained with the embodiment according to FIG. 1.

FIG. 1 diagrammatically shows the whole transmission housing 1 with the engine-side cover 2 and a first and second housing partition 3 and 4, and the rear wall 5 of the housing 1. The partition 3, removable from the housing through the cover 2 after detaching a flange 6, allows access to the most stressed parts of the input group 7 without requiring opening of the main group 8 situated behind the second housing partition 4. Structurally and operatively between the input group 7 and the main group 8, a free space for an intermediate transmission 9 is provided which in the embodiment consists of one creeping gear step. The main group 8 can thus be completely and finally mounted between the rear wall 5 and the partition 4 prior to the installation of an intermediate transmission 9 or an input group 7. Since the geometries of the installation groups are selected so that the powershift clutches, A, B, C, D, F, G or synchronizer clutches 18, 20 can be introduced subsequent to installation of the main group, the definitive decision in the equipment is not needed until the end phase of the assembly. The input group 7 has in addition to the input shaft 11 two other parallel shafts 12 and 13. The first countershaft 12 drives the main group 8 and the second reverse shaft 13 drives the reverse gear. Upon each one of said shafts is a powershiftable double multi-disc clutch CA, DB and GF of the same structure and size whose clutch bells 14, 15, 16 are rotatably supported on the respective shafts 11, 12, 13 which are directly or indirectly engaged with each other via external gearings. The bell 14 is constantly engaged with both the bells 15 and 16, but bell 15 is not engaged with the bell 16. For this purpose, the shafts 11, 12, 13 of the input group 11 are arranged to form an equilateral triangle and the external gearing of the bell 15 extends past the external gearing of the bell 16 without meshing, however, the external gearing of the bell 15 does mesh with the external gearing of the bell 14. Each clutch bell is divided by a radial web that carries it on its hub into two equal friction-disc sets which separately or jointly are activatable against opening spring tensions by separate hydraulic pistons, not specially identified here. The two equal friction sets are activatable by means of presurized fluid from the discs present in the shafts 11, 12, 13 while bringing into positive engagement the external discs non-turnably held by the respective bells 14, 15, 16 with the internal discs which are respectively held by its own internal disc carrier. The latter can be driven along either directly with the respective shafts 11, 12, 13, as in the clutch B and G, or indirectly by a hub or hollow shaft rotatable upon the respective shafts 11, 12, 13, as in the clutches C, A, D and F. The hollow shaft which supports the internal disc carrier of the clutch C is here the input shaft 11 which is driven by the main drive shaft 10 as soon as the engine, not shown, rotates. The input shaft 11 here drives in the same direction of rotation an idler gear 17 which projects above the diameter of the input-clutch bell 14 and is situated on the drive side in front thereof. An idle gear 18 is supported on the input side in front of the countershaft clutch bell 15 and the internal disc carrier of the clutch D is connected therewith by a common hub on the countershaft 12. On the output side in front of the input-clutch bell 14 and connected with the internal disc carrier thereof by a common hub, another idler gear 19 is situated which is engaged with a fixed gear 20 projecting above the diameter of the countershaft clutch bell 15 upon the countershaft 12 and extending into the main group 8 or the clutch shaft 32 coaxial therewith. The fixed gear 20 meshes here with a smaller idler gear 21 which is provided on the reversing shaft 13 on the output side of the reverse clutch bell 16 and connected with the internal disc carrier thereof via a common hub. On the countershaft 12 there is placed behind the fixed gear 20, on the output side, another somewhat smaller fixed gear 22 which is in engagement with a fixed gear 23 secured upon the reversing shaft 13 and situated on the output side behind the idler gear 21 and having a diameter that projects above the diameter of the reversing clutch bell 16. In the embodiments, a smaller idler gear 24 also meshes with said fixed gear 23 and is situated behind the output-side idler gear 19 of the input clutch 14 on the same shaft 10, which, by means of a sliding sleeve 25 non-turnable upon the main drive shaft 10 and a corresponding clutch gearings, can be brought into positive engagement with the main drive shaft 10. The same sliding sleeve 25 can also produce a positive engagement of the main drive shaft 10 with the idler gear 19 behind the output-side input clutch bell 14. Thereby, a bypass operating connection operable either forward or rearward depending on the OV/OR position is obtained for bypassing the powershift clutches dependent on the functioning current and hydraulic supplies whereby a tow start or mechanical emergency travel operation is possible via the gears of the main group 8. This device with the gears 22, 23, 24, 25 is not required when using positive-engagement or synchronizer clutches in the input group 7, since a failure of current or hydraulic cannot then lead to the total blockage of the clutches.

Figure 1:
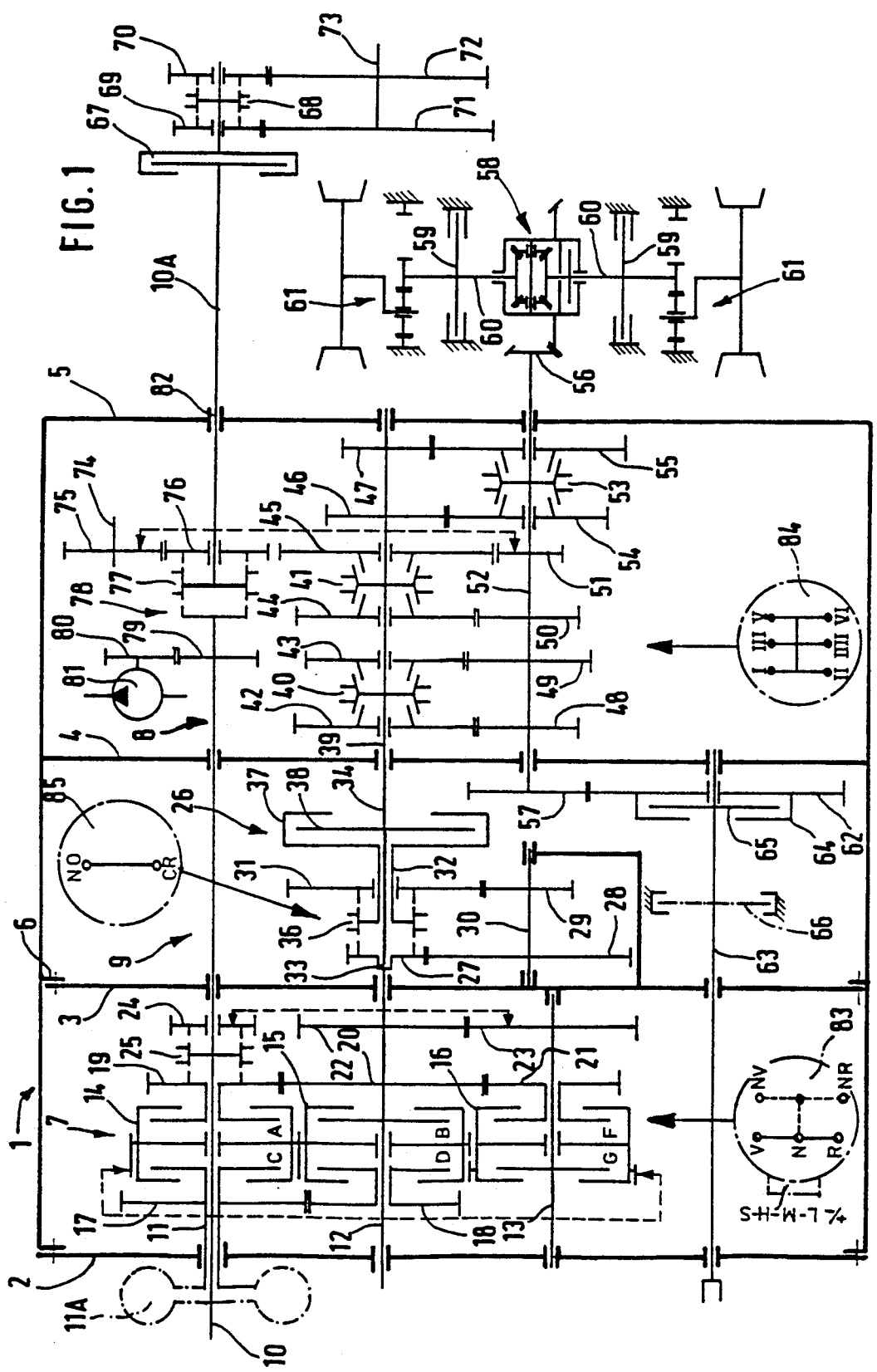
FIG. 1 diagrammatically shows the gear-change transmission with multiple steps in the embodiment preferred for higher performances with power shift clutches vertically aligned in respect to each other and reverse gear in the input group.

The intermediate transmission 9 which in the embodiment is situated according to the invention axially between the input group 7 and a starting and separating clutch 26 and disposed immediately in front of the main group 8 can be omitted at will without changes in the housing, etc. when no special importance is attached to a creeping gear or overdrive. In the first case the intermediate transmission consists essentially of a small fixed gear 27 on the output side of the first housing partition 3 on the first countershaft 12 which fixed gear drives a double-gear 28/29 on an intermediate shaft 30 parallel to the clutch 26 whose ends are supported in the first and the second housing partition 3, 4. In the case of a creeping gear, the double gear 28/29 has a large drive-side gear and a small output-side gear respectively 28 and 29. The latter drives a large idler gear 31 on the primary shaft 32 of the starting and separating clutch 26. Said primary shaft 32 is aligned both coaxially with the countershaft 12 with which it has in common an axle bearing 33 and with the drive shaft 34 of the main group 8 which forms the secondary shaft of the starting clutch 26. The primary shaft 32 is fixed or axially supported by means of another axle bearing 35 in front of the internal disc carrier of the starting and separating clutch 26 within the housing thereof. Axially positioned between the fixed gear 27 and the idler gear 31 is a sliding sleeve 36 which is non-turnable with the primary shaft 32. Placed on the internal surfaces facing it of the gears 27 and 32 are corresponding clutch gearings. Thus, the sliding sleeve 36 can effect upon engagement with the gear 27 a direct through drive from there into the primary shaft 32 without stepping up or down or, upon engagement with the gear 31, an upstepped or downstepped through drive through the intermediate shaft 30 with which all the ratio steps of the gear-change transmission are increased or reduced into the ratio selected.

Instead of the above described step down of the creeping gear, an over drive ratio can also be provided in the same place. For this purpose the fixed gear 27 must be large and the drive-side gear 28 of the double gear 28, 29 must be small, and the successive gear 29 must be large and the idler gear 31 must be small. The reversing clutch 26 is then advantageously a synchronizer clutch to do justice to the high speeds mostly prevailing when in reverse. In the embodiment, the primary shaft 32 drives directly the starting clutch bell 37 of the starting clutch 26 which is designed as an external disc carrier of a wet brake which is pressure-cooled upon actuation and with internal discs 38 on the secondary shaft 34. In the embodiment said secondary shaft 34 is the drive-side end projecting from the second housing partition 4 of the drive shaft 39 of the main group 8. On said shaft 39 are two double synchronizer clutches with idler gears 42, 43 and 44, 45 on both sides adapted to be engaged by their driven sleeve carriers 40, 41, and two adjacent fixed gears 46, 47, respectively. The idler gears 42 . . . 45 mesh here with correspondingly dimensioned and situated fixed gears 48, 49, 50, 51 on a second countershaft serving as drive shaft 52 of the main group 8 and upon one end of which is also a third synchronizer clutch with non-turnable sleeve carrier 53 and coordinated idler gears 54, 55 which mesh with both fixed gears 46, 47 on the drive shaft 39.

In the embodiment, the drive shaft 52 has on both its ends respectively drive gears 56 and 57. The output-side shaft end projecting from the housing rear wall 5 drives a bevel gear which drives a cup gear of a lockable axle differential 58 which on one side drives with gear head planetary transmissions 61 and rear-axle shafts 60 provided with brakes 59. The output gear 57 projecting from the second housing partition 4 on the drive side is a spur gear which drives an idler gear 62 on a front-axle drive shaft 63. The idler gear 62 also engages the bell of a front-axle changeover clutch 64 designed as an external disc carrier. Its internal disc carrier 65 is non-turnable with the front-axle drive shaft 63 which extends below the input group 11 and exists on the end face thereof from the housing cover 2. When the gears 28 and 29 are not too large, space still remains below the intermediate transmission 9 to place, on the front-axle drive shaft 63 at the output side of the change-over clutch 64, a shaft brake 66 which in this diagram is only indicated by dotted lines.

The main drive shaft 10 situated in the upper part of the transmission housing 1 is surrounded in the area of the input group 7, predominantly in the manner of a hollow shaft, by hubs to be regarded as input shaft 11 of the gear and clutch elements 17, 14 and 19 situated thereon. In the embodiment, the main drive shaft 10 extends outside of the input group 7 as a not surrounded solid shaft axially covering the main group 8 until exiting the transmission rear wall 5 and up into a power take off shaft connecting clutch 67 which can be designed in any manner desired. The power take off connecting clutch 67 is a double clutch with a non-turnable sleeve carrier 68 and adjacent idler gears 69, 70 of different sizes which are in engagement with a power take off shaft 73 by fixed gears 74, 72 of different sizes. It is thus possible, depending on the shift direction of the sliding sleeve, to drive the power take off shaft 73 indirectly stepped down via the gears 69, 71 or 70, 72 with optionally two additional speeds. On the portion of the main drive shaft 10 which extends freely and independently of the transmission, other diverse power take offs can be directly attached on the output side of the input group 7. The above described power take off 67 is operable at engine speed and can also be driven optionally at the speed prevalent at the output of the main group by an output of a quickly rotating fixed gear 51 on the output shaft 52 of the main group 8, via an intermediate gear 75 guided on a power take off shaft 74, an idler gear 76 disconnectable from the main drive shaft 10 and a coordinated sleeve carrier 77 of a shut-down clutch 78. Also, the output-side portion of the main-drive shaft, separated from the main shaft 10, can be used as a so-called directional power take off shaft 10A.

The central pump drive for the gear-change transmission is also preferably situated on the main drive shaft 10 above the main group 8 while a fixed gear 79 is placed before the shut-off clutch 78 engaging a meshing gear 80 that on one side drives the pump 81. All shafts 10, 10A, 12, 13, 30, 34 and 39, 52 and 63 are frictionlessly supported in roller bearings 82 in the diverse housing partitions 3, 4, or housing rear wall 5, or the cover 2 and pressure lubricated from the shafts by means of bores in oil ducts in the shafts.

The mode of actuation of the clutches in the input group 7 can be any one desired, but is here provided by means of a rotary lever 112, 113 with gear selector 83 and integrated tumbler switch 112 for working uses whereby the positions for forward travel V, neutral N, reverse travel R can be introduced in the steps for SLOW L, MEDIUM M, HIGH H and for OVERDRIVE S. Also, optionally, after releasing a lock not shown here, there can be introduced with the same gear selector 83 an emergency control for forward V or reverse R suggested in powershift clutches.

The road travel gear selection via the shift lever 84 can in itself remain unchanged during operation. In case the intermediate transmission 9 is installed, the changeover lever 36 thereof can be placed in the creeping or overdrive gear via another shift lever 85 having two end positions. All said gear changes are also carried out electro- or servo-actuated in a manner known depending on the comfort desired. The powershift clutches can also be automated at low extra cost.

In FIG. 2, the input group 7 is designed in principle with the same arrangement of the shafts 10, 11, 12, 13 as in the equipment with powershiftable double clutches, but without the dog clutch provided as mechanical emergency gear selection and bypass on shaft 10 with sliding sleeve 25, and without idler gear 19 and the engagement of the fixed gears 23, 23 on shaft 12 or 13. The driving connections for the double clutches C/A and D/B consist here only of mechanically actuatable double synchronizer clutches 18+20, which by virtue of the design of the gear-change transmission according to the invention suffice also in medium torques and performances, and even when the creeping gear is introduced, they are still easily engageable and allow less expense in control than with powershift clutches. With a construction to a great extent the same as the powershift transmission, a good interchangability of parts results due to many parts which coincide with those in the design of the powershift transmission.

A reverse gear, fully integrated into the input group 7 the same as the other gears, is introduced by engaging the synchronizer clutch 20C and is thus also easily engageable in this design. In this embodiment, the main drive shaft 10 is not surrounded by an input shaft 11, but, according to a simple vibration damper 11A, is a solid shaft directly carrying along the hubs of the fixed gears 17A, 17B and 17C and having a plug-in sleeve connection 86 (see FIG. 3) for an extension shaft 10A to a power take off terminal in the area of the bearing 82 in the first housing partition 3. The fixed gears 17A and 17B mesh with idler gears 18A and 18B on both sides of a firm sliding-sleeve carrier 18C on the drive-side end of the first countershaft 12. The fixed gear 17C meshes with the drive-side idler gear 20A of the output-side synchronizer clutch with the sliding-sleeve carrier 20C being likewise non-turnable on the first countershaft 12. On the output side of countershaft 12, an idler gear 20B is present which meshes with a fixed gear 21A on the reversing shaft 13 parallel to the first countershaft 12. On the drive-side end of the reversing shaft, another fixed gear 23A is also driven along by the driving fixed gear 17A on the contact shaft 10 or 11. Said reversing shaft 13 is here provided with a shaft stub which through its bearing 82 penetrates into the first housing partition 3 and upon which is concentrically supported, when an intermediate transmission 9 is installed, the shaft 30 thereof with the creeping gears 28/29.

A front-axle shaft brake 66 is held on the housing cover 2 and not on housing wall 3 or 4 so that radially below the intermediate shaft 30A, building space remains for eventually larger intermediate transmission gears 28, 29 for the case that an overdrive ratio can be installed.

Figure 3:
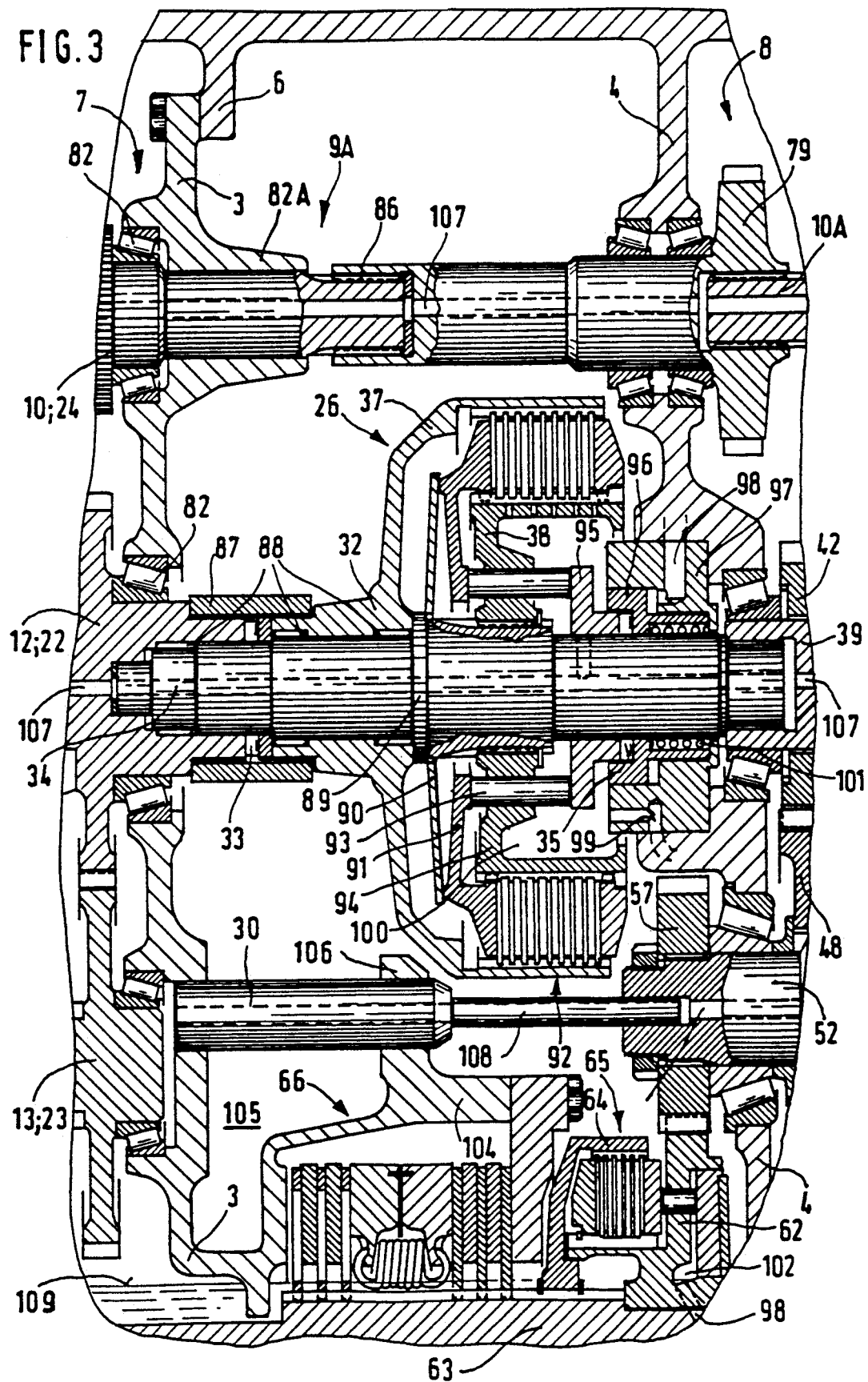
FIGS. 3, 4 & 5 show as constructional embodiments the configuration of the starting clutch area one time without intermediate transmission but with installation place therefor, one time as creeping gear, and one time as overdrive, respectively.

FIG. 3 structurally shows the inner area of the housing, from the first to the second housing partition 3, 4, where the starting clutch 3, 4 is without the intermediate transmission 9 which is for optional installation. However, adequate free space 9A is left for the additional axial space needed for the intermediate transmission 9. The main drive shaft 10 is passed into the first housing partition 3 in a bearing 82 in whose neck 82A there is oil supply ducts (not shown) leading to the lubrication places and clutch cylinders, etc. On the output side of the bearing neck 82A, the main drive shaft 10 ends in an externally geared shaft stub, which substantially radially lies over the starting clutch 26, which is non-turnably inserted in the hollow end of the power take off shaft 10A and thus, constitutes an easily detachable plug-in sleeve connection 86 and facilitates the changes of the power take off shaft 10A.

Another plug-in connection 87, non-turnable but axially limitedly movable with integrated axle and radial bearings 33, is provided in the connection of the first countershaft 12 to the secondary shaft 34 of the starting clutch 26. The secondary shaft 34 is here inserted with rotary motion in a hollow end of the countershaft 12. When the intermediate transmission 9 is omitted, there is provided on the externally geared shaft stub of the shaft 12 another plug-in connecting sleeve 87, which surrounds the drive-side axial bearing 33 of the hub, which drives the starting clutch bell 37 which has roller bearings 88 on the secondary shaft 34. On the output side of the hub serving as primary shaft 32 of the starting clutch bell 37, the latter abuts axially against a supporting collar 89 on the secondary shaft 34. On the output side of the supporting collar is abutting with its inner edge, a cup spring 90 whose external edge is supported in an output direction against a clutch pressure plate 91 which presses against the disc set 92 of the starting clutch 26. The external discs of said starting clutch are here non-turnably held by the clutch bell 37. The clutch pressure plate 91 is axially loadable on its inner edge, imposed to the cup spring 90 which engages in an external one third thereof, by several bolts 93 which concentrically penetrate the internal disc carrier 94 non-turnably and fixedly held on the secondary shaft 34. For this purpose, they are pressurized on the output side of the internal disc carrier 94 by an adjusting-piston pressure plate 95 with which is coordinated on the output side another axial bearing 35 against which presses the adjusting piston 96 of the starting clutch 26 during the ventilation process. The piston is passed into an adjusting cylinder annular body 97 which comprises the primary shaft 34 and an annular adjusting piston 96 that surrounds it and which is fixedly inserted in the second housing partition 4 on the drive side before the bearing 82 of the drive shaft 39 of the main group 8. In the adjusting cylinder body 97, both the clutch pressure line 98 for actuating the adjusting piston 96 and a coolant line 99 enter from the second housing partition 4. The latter discharges in a pocket-like annular space 100 radially below the disc set 92. Starting from here the coolant can overflow into the disc set 92 in a manner known per se as the pressure is increased by centrifugal forces with uniform distribution through radial bores, not indicated in detail, in the cover of the internal disc carrier 94. The duration of flow and intensity of the coolant can be coupled by a dosing device (not particularly shown) with the axial path of the adjusting piston 96 or of the coordinated pressure plate 95 in a manner such that the cooling occurs only when the clutch 26 is engaged. In order to eliminate axial play of said actuation mechanics without adjusting the force, the adjusting piston 96 is also stressed into an opening direction by a spiral spring 101 inserted therein so as to overcome the closing force of the plate spring 90. In the starting clutch 26, a special design has been selected with the above described construction with particularly low weight which is obtained without a co-rotating cylinder and allows for the use of a correspondingly light clutch bell 37. When the oil pressure rises in the adjusting cylinder 97 beyond the closing force of the cup spring 90, the clutch 26 is maximally opened to the extent that sufficient play results to obtain minimal drag torques.

The secondary shaft 34, surrounded by the adjusting cylinder body 97 together with the components and accessories, is inserted in the output side of the bearing 82 and radially therebelow in the drive-side hollow end of the drive shaft 39 of the main group 8 and is secured against rotation. The idler gear 42 attached thereto meshes with the fixed gear 48 provided under the drive shaft 39 on the output shaft 52 extending parallel thereto in the main group 8. The drive-side end thereof is supported in the second housing partition 4 with a bearing 82 from which it projects on the drive side by a free end substantially as far as the adjusting cylinder body 97. In the embodiment, on said free end of the output shaft 52, a drive fixed gear 57 is secured by means of inner gearing and front-landed shaft nut or the like. Said fixed gear 57 drives a fixed gear 62 situated therebelow which, secured on a drive shaft 63 of the front axle, has on the output side an opening cylinder 102 for the front-axle change-over clutch 64 and is the internal disc carrier thereof. When the pressure rises in said cylinder, it can be brought into positive engagement by several axially guided pistons 103 distributed on the periphery which penetrate the web of the fixed gear 62 in the direction of the disc set 65. Thereby, the front-axle shaft 63 can be driven via the bell of the clutch 64. The front-axle drive shaft 63 also has situated upon it a front-axle shaft brake 66 whose external discs are held in a brake housing 104 connected with the first housing partition 3. The brake 66 is here fully aligned and thus well cooled by the sump of the transmission housing 1.

In the embodiment, the connection of the brake housing 104 with the first housing partition 3 is designed radially over the brake 66 as the upwardly open dished bulge 105 with a second wall area 106 rising on the output side over the intermediate axle 30. Thus, resulting in a second possibility of support for the intermediate axle 30 specially required in the installation of the intermediate transmission 9. A separate oil pocket radially under the intermediate transmission 9 then provides good immersion lubrication.

The intermediate axle 30, the same as all shafts 11, 12, etc., of the transmission, can likewise be provided with at least one coaxial oil duct 107 which ensures in the bearing points the lubrication of the bearings 82 or idler gears, etc. To connect said oil duct 107 in the intermediate axle 30 with the one in the drive shaft 52 of the main group 8, a connecting tube 108 leading out from the intermediate axle 30 is inserted in the drive-side end of the main group.

Figure 4:
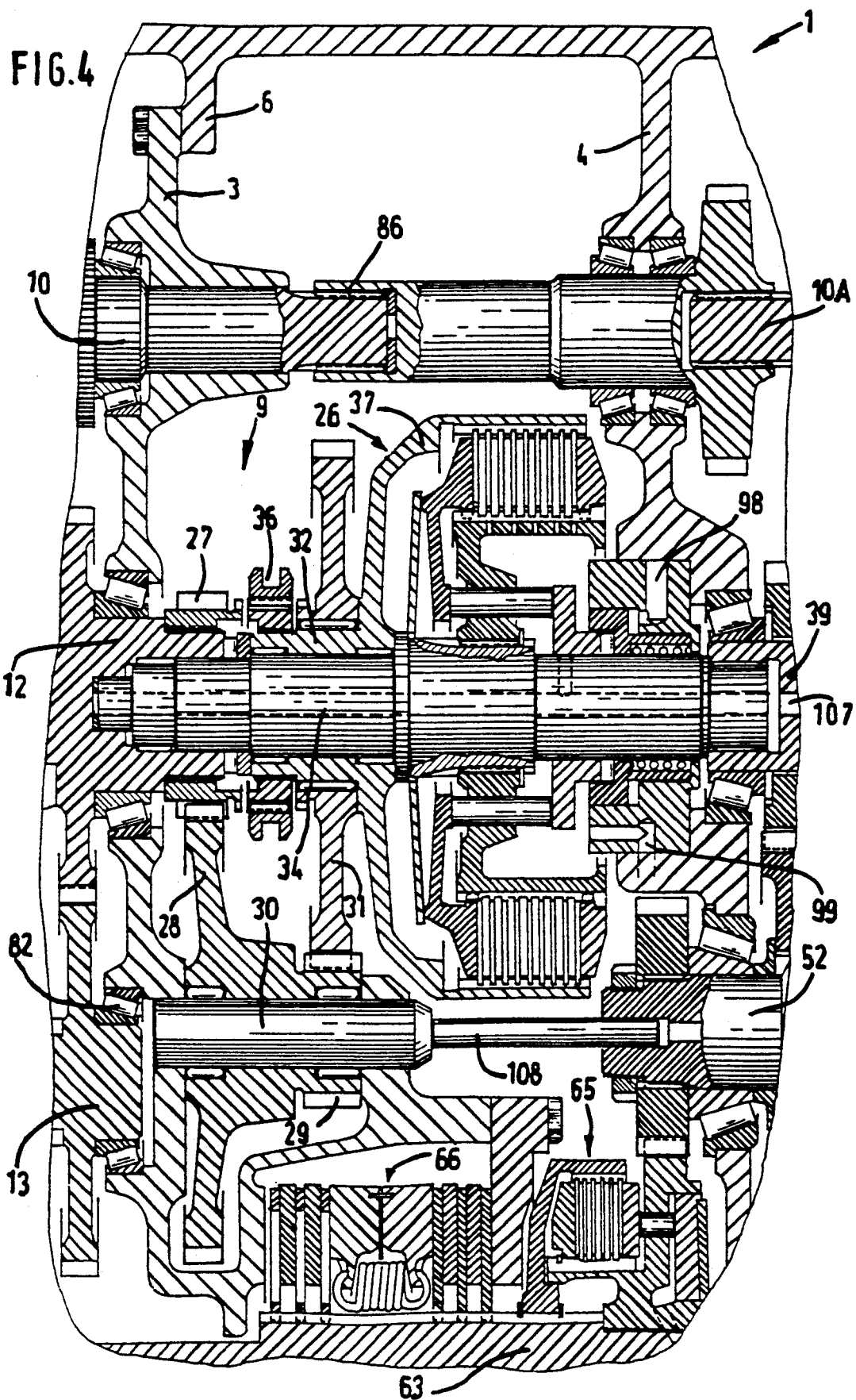

FIG. 4 again shows the same section of the gear-change transmission of FIG. 3, but now with the intermediate transmission 9 installed instead of the plug-in sleeve connection 87. Said intermediate transmission is designed in this embodiment as a creeping gear transmission. For this purpose the input gear 27, having the smallest possible diameter and supported on the end of the first countershaft 12 projecting through the first housing partition, is provided with an output-side clutch gearing in which a sliding sleeve 36 is insertable which is non-turnable on a sleeve carrier with a primary shaft 32 shaped as the hub of the clutch housing 37. Axially between the sleeve carrier and the clutch housing 37, a large idler gear 31 of a diameter only somewhat smaller than that of the clutch housing 37 is rotatably supported. Said idler gear 31 has on the sleeve-carrier side the additional corresponding clutch gearing for the sliding sleeve 36. The gear 28 driven by the input gear 27 on the intermediate axle 30 is designed with a diameter substantially as large as the idler gear 31, and by its hub, it is integral as a double gear with an output pinion gear 29 which is as small as possible and in turn meshes with the idler gear 31. The whole hub is rotatable on the intermediate axle 30 by needle bearings and is laterally fixed on one side by the first housing partition 3 and on the other side by the raised edge of the second wall area 106. As soon as the sliding sleeve 36 engages in a clutch gearing provided on the drive side of the idler gear 31, the primary shaft 32 is no longer driven directly at the speed of the countershaft 12, but at a stepped up or stepped down speed according to the ratios of the intermediate transmission 9. The sliding sleeve 36 is simultaneously released from the clutch gearing of the fixed gear 27. The output gear 31 of the creeping-gear intermediate transmission 9 is thus engaged, and the drive shaft of the main group 8 is accordingly driven at a slower rate. If the sliding sleeve 36 remains out of gear with the clutch gearing of the input fixed gear 27 and also with the clutch gearing of the output idler gear 31, the main group 8 is fully disconnected and the starting clutch 26 is also shut off. If the sliding sleeve 36 remains in the clutch gearing of the input fixed gear 27, then the gears 28, 29, and 31 will freely rotate along, however, the positive engagement of input group 7 takes place directly with main group 8 and only via the sliding sleeve 36 and the sleeve carrier thereof without any stepping up or down. In the creeping gear position, the sliding sleeve 36 is pushed in the output direction into the clutch gearing of the filer gear 31 and is free from the input fixed gear 27 so that the operative connection via the double gear 28, 29 to the starting clutch bell 26 is activated.

The axial distance from the primary shaft 32 needed for installing an intermediate transmission 9 corresponds here substantially to the length of a single gear 27, since the sliding sleeve 36 and the idler gear 31 are carried by the hub, the same is required of the clutch bell 37.

Figure 5:
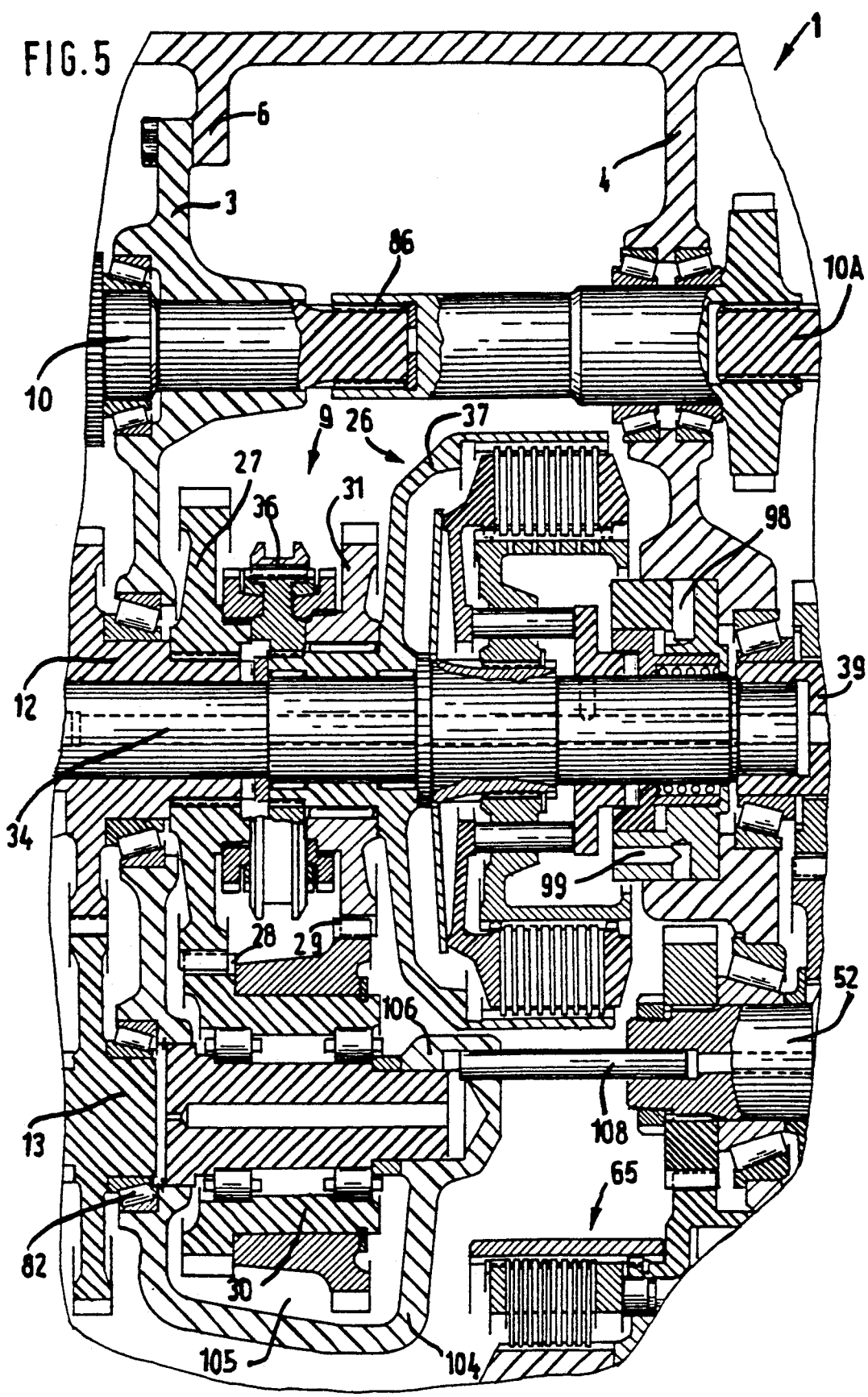

In FIG. 5, instead of the creeping gear transmission, there is installed in the free space 9A provided therefor an intermediate transmission 9 which is a so-called overdrive. Here is provided a gear and clutch system the same as in FIG. 4, but with the difference that the input fixed gear 27 has a larger diameter, the first gear 28 of the double gear is small, the second gear 29 is large, the output gear 31 is again small, and at the same time instead of a simple dog clutch, the sliding sleeve 36 is preferably combined with a synchronizer gear clutch in which great speed differences can be bridged more comfortably and with less noise. In the embodiment, shown in FIG. 5, the front-axle shaft brake 66 has been omitted or moved to the inner side of the transmission cover 2 to provide radial space for the large second gear 29 of the double gear. The dished bulge for the double gear 28, 29 in 3, 104 must then likewise be adequately adapted so that there is to be provided for the first housing partition 3 and flanged in the housing 1 a special shape when using intermediate transmissions 9 with a reduction ratio in overdrive, only if the housing partition 3 has not already been designed so that both the creeping gear and the overdrive version of the intermediate transmission 9 have enough radial space.

Figure 6:
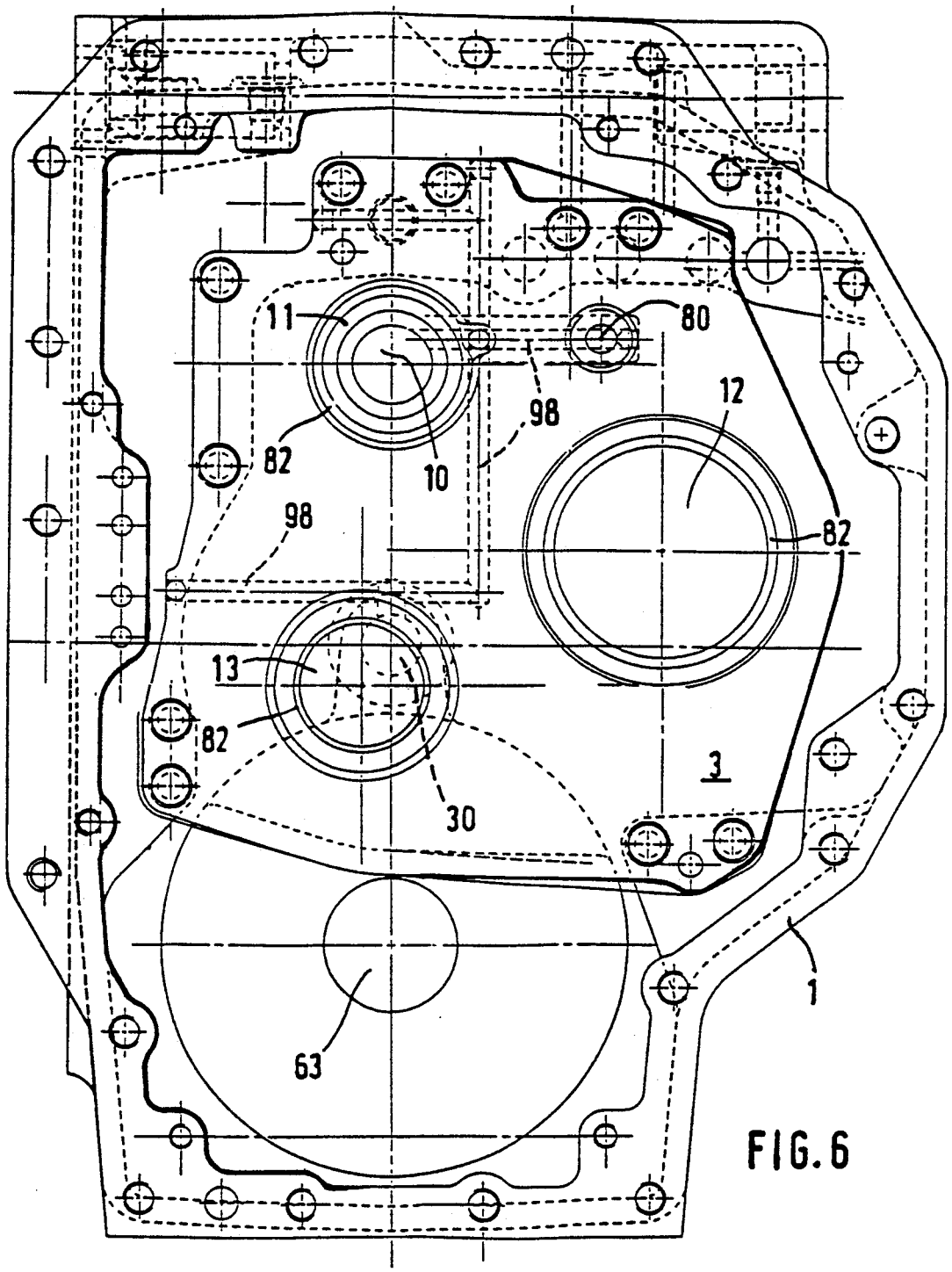
FIG. 6 shows a front view of the housing cover designed to save space and favorable for servicing.

FIG. 6 shows a preferred contour of the housing 1 with a cross-section behind the front cover 2. The input shaft 11, the main drive shaft 10, and 10A surrounded thereby, are provided in the upper half of the housing somewhat to the left of the geometric center within the housing partition 3, which also has bearings 82 for the shafts 12, 13. The center-to-center distances of the shafts 11, 12, and 13 form an equilateral triangle where the countershaft 12, in the line of vision to the right of the verticals through the shaft 11, makes necessary an overhang for the shape of the housing which is rectangular. The reversing shaft 13 lies here only insignificantly to the left of the verticals through the input shaft 11 and somewhat lower than the countershaft 12. The center of the front-axle drive shaft 63 is here precisely perpendicularly under the input shaft 11 but below the lower edge of the first housing partition 3. Thus, when replacing the synchronizer clutches in the input group 7, neither the front-axle drive shaft 63 nor the main group 8 or the starting clutch 26 have to be removed. The side of the transmission housing 1, situated to the left in the travel direction, remains in this arrangement free for attachments, such as tanks, etc. The opposite side offers favorable possibilities of lateral access such as to the pump 81 or the other accessory power take offs such as 75 . . . 78 within the housing 1 and no large transmission parts obstruct such inspection, work, etc.

FIG. 7 shows, with reference to the distance ratios in the verticals V and horizontals H of the diverse shafts 10, 11, 12, 13, 52, 63 relative each other, the constructional steps which were taken to obtain equal speeds in forward and reverse gear as well as favorable ratios and a compact building space. On the upper margin of the figure, the axle of the main drive shaft 10 and of the input shaft 11 similar to a hollow shaft are indicated with dotted lines. The vertical space from there to the countershaft is shown by a V. Then the vertical distance from the input shaft to the reversing shaft 13 is about V×1.73 and to the main-group drive shaft 52 is about V×1.50, the same as to the front-axle shaft 63 which is about V×3.11. The ratio of the horizontal distances H from the reversing shaft 13 up to the input shaft 11 and to the countershaft 12 amounts to about 1:9.9. The positions of the input shaft, the countershaft, and the reversing shaft are hereby given indicating 60° angles for the motive force courses for forward and reverse R. Accordingly, the central points 10/11, 12 and 13 of said shafts form an equilateral triangle standing on an apex. The positions of the output shaft 52 of the main group 8 and of the front-axle drive shaft 63 can be selected herefrom unaffected in themselves or at will. But as advantageous for the latter, a distance for the front axle 63 from the input shaft of about V×3.11 was established.

FIG. 8 and 9 show a one-hand selector switch favorable for carrying out the shift operations in the gearchange transmission of FIG. 1. Said selector switch has at its disposal a housing 110 for installing a console 111 which guides a turning lever 112 in whose handle 113 a multi-step tumbler switch 114 is inserted. A detent spring 115 above or below the housing 110 fixes the selected adjustments. On the lower end of the lever 112, the customary attachments for mechanical (rods, Bowden cables, etc.) and electric (cable) controls 116, 117 are present. The lever 112 is in the neutral position N when perpendicular and when tilted about 20° to the front, it is in the forward travel position V. When it is tilted about 20° to the rear it is in the reverse travel position R. The tumbler switch 114 has a reversing elasticity in the central position of both control directions (+/−) and likewise can be inclined a maximum of about 20° in both directions. Approximately, after each 7°, a contact occurs with about 2° overstroke.

FIG. 10 shows the pertaining shift diagram. The "zero" position is obtainable, if needed, by lateral engagement. The "zero" position is applied to the case of use of the mechanical emergency switch via the clutch 25 in case of a failure of the hydraulics and/or electricity in the input groups which are equipped with clutches actuated by auxiliary power.

FIG. 11 shows in table form the switching sequence for the input group 8. The fields marked with dots show which clutches (A to G) of the input group 7 are to be respectively activated by the above described turning lever 112 or the tumbler switch 114 when the design is based on powershift clutches. All these gears of the gears 1 through 6 of the main group 8 can be engaged in each of the travel directions V and R by separate conventional mechanical gear levers not shown. Another, not constructionally shown lever or switch which upon actuation simultaneously locks the lever of the main group 8 for the gears 5 and 6 is provided for the creeping gear CR. The positions L, M, H, and S of the tumbler switch 114 correspond to the expressions for "SLOW", "MEDIUM", "HIGH" and "OVERDRIVE". Since the tumbler switch is inserted in the mechanical lever 112, despite the large number of gears, the driver during individual gear changes can leave his hand on the wheel. In the distribution shown in FIG. 1, 24 forward and 24 reverse gears can be selected at normal speeds. When using the creeping gear or overdrive intermediate step 16 V+R gears can be selected. When using the overdrive intermediate step 9 24 V+R gears can be selected. With this large number of possible ratios, it is possible to obtain with very small ratio steps in the input group 7 of 1.2 a very smooth and tractive travel such as for plowing operation in the field and also overdrive operation for the road, which corresponds to a speed range of about 0.3 km/h to about 60 km/h.

REFERENCE NUMERALS

1—housing
2—housing cover
3—first housing partition
4—second housing partition
5—housing rear side
6—housing inner edge flange
7—input group with multi-disc clutches CA, DB and GF
8—main group
9—intermediate transmission (optionally creeping gear or overdrive)

10—main drive shaft
10A—power take off shaft
11—input shaft of 7
11A—vibration damper or fluid clutch
12—first countershaft
13—reversing shaft
14—input clutch bell
15—counter clutch bell
16—reversing clutch bell
17—idler gear on 10 on drive side
17A—medium fixed gear on 11 on drive side in FIG. 2
17B—large fixed gear on 11 about center in FIG. 2
17C—small fixed gear on 11 on output side in FIG. 2
18—medium idler gear on 12 on drive side
18A—large idler gear on 12 on drive side in FIG. 2
18B—small idler gear on 12 on output side of FIG. 2
18C—gear-change sleeve on fixed gear on 12 in FIG. 2
19—idler gear on 11 on output side
20—fixed gear on 12 on output side
20A—large idler gear on 12 on drive side in FIG. 2
20B—small idler gear on 12 on output side
20C—gear-change sleeve on fixed gear on 12 in FIG. 2
21—idler gear on 13 on output side
21A—large fixed gear on 13 on output side in FIG. 2
22—fixed gear adjacent 20
23—fixed gear adjacent 21
23A—small fixed gear on 13 on drive side in FIG. 2
24—idler gear on 10 after 19
25—sliding sleeve on 10 between 19 and 24
26—starting and separating clutch between 12 and 34/39
27—fixed gear on 12
28—input gear of the double gear
29—output gear of the double gear
30—intermediate shaft for 28/29
31—idler gear on 32
32—primary shaft of 26
33—axle bearing on 12
34—secondary shaft of 26 or drive shaft of 8 and 39
35—axle bearing in 26
36—siding sleeve of the change-over clutch on 32
37—starting clutch bell on 32
38—internal disc carrier of 26
39—drive shaft of 8
40—sleeve carrier situated in front on 39
41—sleeve carrier situated in rear on 39
42—idler gear in front of 40
43—idler gear in rear of 40
44—idler gear in front of 41
45—idler gear in rear of 41
46—fixed gear in front of 39
47—fixed gear in rear of 39
48—fixed gear on 52 to 42
49—fixed gear on 52 to 43
50—fixed gear on 52 to 44
51—fixed gear on 52 to 45
52—output shaft of 8
53—sleeve carrier on 52
54—idler gear on 52 in front of 53
55—idler gear on 52 in rear of 53
56—output gear to rear axle
57—output gear to front axle
58—axle differential
59—rear-axle brake
60—rear-axle shafts
61—wheel head-planetary transmission
62—fixed gear on 63
63—front-axle drive shaft
64—front-axle change-over clutch or external disc carrier
65—disc set of 64
66—front-axle shaft brake
67—power take off shaft-change-over clutch
68—sleeve carrier behind 67
69—idler gear before 68
70—idler gear behind 68
71—fixed gear at 69
72—fixed gear at 70
73—auxiliary shaft for 71, 72
74—auxiliary shaft with 75, 76
75—intermediate gear on 74
76—idler gear
77—sleeve carrier
78—switch-off clutch for directional power take off shaft
79—fixed gear on 10
80—meshing gear at 79
81—pump and input
82—antifriction bearings for shafts in housing wall
82A—bearing neck with oil-supply ducts
83—gear selector for input group 7
83A—gear selector for input group according to FIG. 2
84—gear selector for main group 8
85—gear lever for intermediate transmission 9
86—plug-in sleeve connection for 10/10A
87—plug-in sleeve connection for 12/32
88—needle bearing of 32
89—supporting collar of 34
90—cup spring in 26
91—clutch pressure plate
92—disc set
93—bolt
94—internal disc carrier
95—pressure plate of adjusting piston
96—adjusting piston
97—body of adjusting cylinder
98—clutch pressure line
99—coolant line
100—pocket-like annular space in 26
101—spiral spring
102—opening cylinder of 64
103—actuation piston of 64
104—brake housing of 66
105—dished bulge of 9A between 3/104
106—second wall area of 3
107—oil duct in intermediate axle and shafts
108—connecting tube of 30 at 52 with 107
109—upper limit of oil level
110—switch housing
111—console
112—turning lever
113—handle of 112
114—tumbler switch
115—detent spring
116—connection for control linkage
117—cable terminal
A—clutch on 11 with 19
B—clutch on 12 with 20
C—clutch on 11 with 17
D—clutch on 12 with 18
F—clutch on 13 with 21
G—clutch on 13 with 23
V—forward travel direction (or vertical distance in FIG. 4)
R—reverse travel direction
L—SLOW adjustment of 114

H—HIGH adjustment of 114
S—OVERDRIVE adjustment of 114
NO—neutral position in intermediate transmission 9
CR—creeping gear adjustment in intermediate transmission 9
NV—towing forward adjustment in 25
NR—towing reverse adjustment in 25

We claim:

1. A gear change transmission having multiple gear steps comprising:
   a starting clutch and a plurality of transmission groups;
   one of said transmission groups being a wide step main group (8) having a plurality of synchronizer clutches (40, 41, 53) for selecting desired speed ranges, said main group having a drive shaft (39) and an output shaft (52);
   another of said transmission groups being a closely stepped input group (7) located on an input side of said main group (8) for fine tuning the speed within a speed range selected by said main group (8);
   said input group (7) having a first counter shaft (12) axially aligned with said main group drive shaft (39);
   a main input shaft (10, 11) being parallel to and offset from said first counter shaft (2), said main input shaft (10, 11) extending past said main group (8) and being operatively connectable with a power takeoff shaft (73) located on an output side of said main group (8);
   said starting clutch being operatively positioned between said first counter shaft (12) and said drive shaft (39) and co-axial therewith;
   said starting clutch having a friction disc set, said friction disc set being cooled by a flow of pressurized oil, the flow of pressurized oil being stopable when the starting clutch is engaged.

2. A transmission according to claim 1, comprising a clutch bell (14, 15, 16) containing power shiftable disc clutches axially aligned with respect to each other, on each shaft (10/11, 12, 13) of said input group (7).

3. A transmission according to claim 2 further comprising:
   two gears of different size one on each side of said multi-disc gear clutch on said input shaft, said two gears being non-rotatably connected with each internal disc carrier of said bear clutch on said input shaft;
   an idler gear being situated on said first counter shaft (12) on the input side of said multi-disc gear clutch of said first counter shaft and two co-axially disposed fixed gears (20/22) of different sizes being situated on the output side;
   said input side idler gear (18) in one of said output side fixed gears being adjacent said clutch, and non-rotatably connected with an internal disc carrier of the multi-disc gear clutch (D/B);
   two axially spaced fixed gears of different size on said reversing shaft on the output side of said multi-disc clutch of said reversing shaft;
   one of said fixed gears of said reversing shaft being adjacent said clutch and non-rotatably connected with a first internal disc carrier of said multi-disc clutch via a short hollow shaft;
   the other of said fixed gear of said reversing shaft being axially spaced from said first fixed gear opposite said clutch and being non-rotatably connected with a second internal disc carrier via a solid shaft that penetrates said hollow shaft;
   both fixed gears (17/19) on said input shaft (11) being engaged on one side with the input side idler gear
   both fixed gears (21/23) on said reversing shaft (13) being engaged with both fixed gears (20, 22) on said first counter shaft (12).

4. A transmission according to claim 3 wherein the ratio of the vertical centered-to-centered distances (v) from said input shaft to said counter shaft and to said reversing shaft is approximately 1:1.73, and the ratio of the horizontal center-to-center distances (8) from said reversing shaft to said input shaft and to said counter shaft is approximately 1:9.9.

5. A transmission according to claim 4 wherein the ratio of the vertical center-to-center distance from said input shaft to said counter shaft is approximately 1:1.5 and the ratio to the rear situated, parallel, front axle drive shaft (63) is approximately 1:3.11.

6. A transmission according to claim 5 wherein
   the input side end of said drive shaft (52) of said main group projects from a bearing (82) through said second housing partition (4), a fixed gear (57) on said input side end of said main group drive shaft (52),
   said fixed gear (57) engaging in idler gear, said idler gear (62) being an internal disc carrier (65) of a front axle change over clutch (64) on a front axle drive shaft (63) which has bearings (82) both in said second (4) and said first (3) housing partitions;
   said idler gear having a central web, a hydraulic cylinder being inserted in said web of said idler ear (62), a piston in said cylinder said piston opens the disc of said disc carrier against an opposing cup spring, a bell having external discs held by their hub on said front axle drive (63).

7. A transmission according to claim 6, comprising:
   a disc brake (66) behind said front axle drive change over clutch (64), said disc brake being operatively situated with double expanding pistons between the two disc sets;
   said internal discs being non-rotatably mounted on said front axle drive shaft (63) and the external discs being non-rotatably mounted over a brake housing (104) in said second housing partition (4).

8. A transmission according to claim 2 further comprising:
   one identical double disc clutch per shaft in said input group (7), said clutches being vertically aligned with each other, external gearing on each of said clutch bells of said input group;
   said input clutch bell (14) external gearings permanently engaging both said external gearing of said counter shaft bell (15) and with said external gearing of the reversing shaft bell (16);
   said external gearing of said reversing bell being axially short so as to remain out of gear with respect to said counter shaft bell (15).

9. A transmission according to claim 1 comprising:
   said input group having a reversing shaft (13) parallel to and offset from said first counter shaft (12) and said main input shaft (10, 11);
   at least one fixed gear (23, 23a) located on said reversing shaft (13), said fixed gear being in operative connection with said main input shaft (10, 11);
   said starting clutch having a primary shaft (32), an other gear located on said reversing shaft (13) operably connectable with said primary shaft (32) via a gear clutch (20, 16) of the reversing shaft.

10. A transmission according to claim 9 comprising:
said input group having a plurality of synchronizer gear clutches (18a, 18b, 18c, 20a, 20b, 20c) on said first counter shaft (12), each of said synchronizer clutches of said input group having a corresponding pair of idler gears (18a, 18b) such that said clutches have two engagement positions one with each corresponding idler gear, all said synchronizer clutches of said input group being actuatable by a common selector;
wherein in at least one of said engagement positions with one of said idler gears said reversing shaft (13) is operably connected with said primary shaft (32) of said starting clutch (26).

11. A transmission according to claim 1 comprising:
a mechanically operable emergency drive device (24, 25);
said input group having a plurality of gear clutches all being actuable via said mechanically operable emergency drive device (24, 25 for forward and reverse travel via a common gear selector.

12. A transmission according to claim 11 said emergency drive device comprises a positive engagement clutch (25) on said main input shaft, said positive engagement clutch (25) being manually actuatable independently of said gear selector;
said positive engagement clutch engages a drive-side idler gear (19) on said main input shaft (10, 11) that operatively engages a fixed gear (20) on one of said first counter shaft and said primary shaft (32) in a first direction of travel and engages an output side idler gear (24) that operatively engages said primary shaft (32) of said starting clutch via a sliding sleeve on said main input shaft (10/11) in a second direction of travel.

13. A transmission according to claim 9 comprising;
a first housing partition (3) on the output side of said input group (7) a free space between said first housing partition (3) and said starting clutch (26) for an optional intermediate transmission;
one of a non-rotatable sleeve (87), which connects said first counter shaft to a primary shaft (32) of said starting clutch (26), and an intermediate transmission having a positive clutch (27, 31, 36);
wherein one of said sleeve and said positive clutch encloses an axial bearing (33) between said counter shaft (12) and said primary shaft (32).

14. A transmission according to claim 13 comprising;
a drive side stop in said first housing wall (3), an intermediate axle (30) supported upon said drive side stop parallel to said sleeve (87) and substantially at the height of said reversing shaft, a double gear (28, 29) in said intermediate transmission (9) engaging in idler gear (31) on the drive side of said sliding sleeve (36).

15. A transmission according to claim 14 further comprising:
an upwardly open, dished bulge (105), with a second wall area (106) raised on the output side, in the lower area of said first housing partition (3);
said double gear (28/29) of said intermediate transmission (9) being surrounded at the bottom of said intermediate axle (30) by said dished bulge (105);
said intermediate axle (30) being supported both in said first housing partition (3) and in the second wall area (106) of said dished bulge (105).

16. A transmission according to claim 13 wherein said intermediate transmission (9) is a creeping-gear transmission with an input side fixed gear (27) substantially having the diameter of a hub of said starting clutch (26);
the input side half of said double gear (28/29) rotating upon said intermediate shaft and meshing with said fixed gear (27), said input side half of said double gear is at least 1.6 times as large as said fixed gear (27).

17. A transmission according to claim 13 said intermediate transmission further comprising,
a dog clutch (27, 31, 36) forming a synchronizer clutch having friction surfaces and gearings on both sides;
wherein a sliding sleeve (36) transmits, in the input side end position, a ratio-free direct power flow and, in the output side end position, a step up or step down indirect power flow from said counter shaft (12) to one of said primary shaft (32) of said starting clutch and said drive shaft (39) of said main group (8).

18. A transmission according to claim 13 wherein said main group drive shaft (39) of said main group extends into the free space (9) for installation of an intermediate transmission between a second (4) and the first (3) housing partition;
said main group drive shaft serving as an external disc carrier of said starting clutch (37), and is axially guided respectively by an axial roller bearing (33, 35) and an output side radial support collar (89) of said secondary shaft (34) in a drive side of said hub that surrounds said drive shaft (39).

19. A transmission according to claim 1 comprising;
said synchronizer clutches in said main group being double gear clutches on said drive and said output drive shafts of said main group;
each said double gear clutch having a non-rotatable sleeve on said drive shaft (39), two idler gears of different sizes one on each side of said non-rotatable sleeve, said idler gears engaging meshing gears of different sizes non-rotatably mounted on said drive and output shafts respectively.

20. A transmission according to claim 19 wherein
two gear clutch sets together with their idler gears (42, 43 and 44, 45) are provided on said main group drive shaft (39), said clutches are actuable by two sliding sleeves, (40, 41) on said main group drive shaft (39) with a third gear clutch set (53, 54, 55) of the same construction on the output shaft (52);
wherein said idler gears (42, 43, 45) of a first and a second gear clutch set (40, 41) engage corresponding fixed gears (48, 49, 50, 51) on said output shaft (52,), and said idler gears (54, 55) of said gear clutch set (53) on said output shaft (52) engage fixed gears (467, 47) on said drive shaft (39) of said main group (8).

21. A transmission according to claim 1 comprising;
a second housing partition on the output side of said starting clutch and on the input side of said main group, a drive side bearing (82) in said second housing partition for each of said drive shaft (39) and said output shaft (52) of said main group;
said starting clutch having an external disc carrier (37) carrying piston discs therein, a spring (90) biases said piston discs into a closed position, and an adjusting cylinder (97), a piston (96) in said cylinder, said piston (96), upon actuation, presses via an axial bearing (35) against a contact surface

(91) of said external disc carrier overcoming said spring (99), pushing a clutch pressure ring against said discs.

22. A transmission according to claim 21 comprising:
a radial web of said internal disc carrier (94), a clutch pressure plate (91) connected with said internal disc carrier on the input side of said disc carrier, a piston, and an adjusting piston pressure plate (96) pressurized by said piston;
a cup spring (90) axially retained on said drive shaft (39) opposite said clutch pressure plate (91) remote from the friction surfaces, said cup spring is stressed during engagement of said disc set (92) with said clutch pressure plate (91).

23. A transmission according to claim 21 wherein said adjusting piston (96) of said starting clutch (26) is an annular stepped piston having two external cylinder seals, a pre-stressed spiral spring, (101) which is constantly compressed by said adjusting piston plate (95) against the axial roller bearings (35) forming an opening force lesser than the closing force of said cup spring (90).

24. A transmission according to claim 21, comprising:
a radial web on said secondary shaft (34) of said starting clutch (26), said secondary shaft is non-rotatably connected with said drive shaft (39) of said main group (8), said radial web having an internal disc carrier (94) with radial bores toward said disc set (92);
an annular pocket (100) within said internal discs carrier (94), said annular pocket being axial delimited by said radial web and open on the main-group side, an oil duct (99) in said second housing partition (4) horizontally discharges oil;
a supply of lubricating oil is coupled with the actuation of said starting clutch (26), such that pressurized cooling oil is fed in relation to the engaging operations of said starting clutch (26).

25. A transmission according to claim 2 comprising a main drive shaft (10) and a vibration damping device;
said main input shaft (10/11) being a hollow shaft arranged concentric to said main drive shaft (10) and driven by said main drive shaft via said vibration damping device.

26. A transmission according to claim 1 wherein said main input shaft (10/11), said first counter shaft (12) and said reversing shaft (13) in said input group (7) are arranged to form an equilateral triangle.

27. A transmission according to claim 2 wherein said main input shaft (10/11) drives a fixed gear on the output side of said input group (7) which is engaged with the gear (80) belonging to a parallel pump drive (81).

28. A transmission according to claim 1 comprising:
a gear sleeve carrier secured in said first housing partition (3) between said output side idler gear (19) of said input gear clutch (C/A) on said input shaft (11) and the bearing thereof (82) forming a positive operating clutch (23, 24, 25) between one of the main drive shaft and the input shaft (10/11), and the primary shaft (32) of said starting clutch;
said gear sleeve carrier having a limited motion internally geared sliding sleeve (25) engagable with an output side clutch gearing of idler gears (19, 24) on both sides.

29. A transmission according to claim 1 comprising:
a powered takeoff separating clutch (67) having a rear situated double gear clutch (68) on the output side behind said input shaft (10/11) for alternative operating connections via at least two powered takeoff output gears (71/72) of different size.

30. A transmission according to claim 1, wherein said powered takeoff shaft (73) is equipped with a gear clutch idler gear (76) situated on the drive side before said separating clutch (67);
said idler gear is driven by an intermediate gear (75) when said main input shaft (10) has been disconnected by means of a clutch gear (77), said clutch gear being non-rotatable in respect to the end of the powered takeoff shaft;
said intermediate gear meshes with a fixed gear on the output side of said synchronizer clutches (41) of said main group (8), a parallel auxiliary output shaft (74) is attached to said fixed gear (51) as a directional powered takeoff shaft.

31. A transmission according to claim 1 comprising:
an oil level in said transmission housing, said oil level being lower than the axle center of said output shaft (52) of said main group (8).

32. A transmission according to claim 1 comprising:
oil bores in each of said shafts (10/11, 12, 13 . . . 52) of all said transmission groups, said oil bores (107) leading to lubrication points and to adjusting cylinders of said multi-disc gear clutches (A, B, C, D, F, G);
inlet connections being coordinated with said oil bores via annular grooves in said housing partitions (2, 3, 4) and radial bores from said shaft of said transmission groups.

33. A transmission according to claim 1 comprising:
oil duct bores (107) issuing into said first housing partition (3) from an oil supply annular collar when said bearing (82) is on the side of the power takeoff shaft for controlling said multi-disc gear clutches (C/A) on said main input shaft (10/11);
oil duct bores (107) issuing into the front side housing cover (2) from oil-supply annular collars in said bearings for controlling said multi-disc gear clutches (D/B, G/F) on said first counter shaft (12) and on said reversing shaft (13) of said input group (7);
a pressurized oil duct (98) situated in said second housing partition (4) for actuating said starting clutch (26).

34. A transmission according to claim 1 wherein said first housing partition (3) is screwed against a flange edge (6) in the interior of a housing on the drive side.

* * * * *